US008241107B2

(12) United States Patent
Moroney

(10) Patent No.: US 8,241,107 B2

(45) Date of Patent: Aug. 14, 2012

(54) GAMING MACHINE WITH FIXED WILD SYMBOLS AND MULTIPLIER

(75) Inventor: Jennifer Loma Moroney, Neutral Bay (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 530 days.

(21) Appl. No.: 12/400,630

(22) Filed: Mar. 9, 2009

(65) Prior Publication Data

US 2009/0227356 A1 Sep. 10, 2009

(30) Foreign Application Priority Data

Mar. 7, 2008 (AU) ................................ 2008901127

(51) Int. Cl.
*A63F 13/00* (2006.01)

(52) U.S. Cl. ............................... 463/20; 463/17; 463/30

(58) Field of Classification Search .................... 463/20, 463/17, 30

See application file for complete search history.

(56) References Cited

U.S. PATENT DOCUMENTS

| | | | | |
|---|---|---|---|---|
| 2004/0087359 | A1 * | 5/2004 | Cuddy et al. | 463/20 |
| 2005/0164774 | A1 | 7/2005 | Gauselmann | |
| 2006/0189377 | A1 | 8/2006 | Gomez et al. | |
| 2008/0167113 | A1 * | 7/2008 | Plowman | 463/20 |

FOREIGN PATENT DOCUMENTS

AU 762889 7/2003

* cited by examiner

*Primary Examiner* — Ronald Laneau

*Assistant Examiner* — Wilner Jean Baptiste

(74) *Attorney, Agent, or Firm* — Hanley, Flight & Zimmerman, LLC

(57) ABSTRACT

A method for use with a gaming machine arranged to provide a spinning reel game in which symbols are spun up on a plurality of reels to form at least one outcome and, if a winning outcome occurs, the gaming machine awards an award. The method includes (a) if at least one specified symbol is spun up and displayed in a resultant position on a reel, holding the specified symbol in the resultant position for at least one further game in which at least the reel carrying the specified symbol is re-spun; and (b) awarding the award if a winning outcome occurs, wherein a specified symbol comprising part of a winning outcome has the effect of increasing the award if the specified symbol is adjacent at least one other specified symbol.

17 Claims, 6 Drawing Sheets

502

| | | | | |
|---|---|---|---|---|
| A | K | Q | K | 10 |
| 9 | 9 | DOG | A | K |
| Q | J | 10 | 9 | 10 |

Fig. 5A

502

| | | | | |
|---|---|---|---|---|
| 9 | 10 | J | Q | K |
| A | J | DOG | 7 | 9 |
| Q | K | 10 | K | A |

Fig. 5B

504 502

| | | | | |
|---|---|---|---|---|
| 10 | J | K | Q | A |
| A | DOG | DOG | 8 | 9 |
| 7 | K | K | 10 | A |

Fig. 5C

504 502

| | | | | |
|---|---|---|---|---|
| 9 | 9 | 9 | 10 | 7 |
| 8 | DOG (doubling) | DOG (doubling) | J | K |
| Q | A | J | K | 7 |

Fig. 5D

504 502

| | | | | |
|---|---|---|---|---|
| K | K | J | 10 | 9 |
| J | DOG (doubling) | DOG (doubling) | J | Q |
| 9 | DOG (doubling) | 9 | K | A |

506

Fig. 5E

602

| | | | | |
|---|---|---|---|---|
| A | K | Q | K | 10 |
| 9 | 9 | DOG | A | K |
| Q | J | 10 | 9 | 10 |

Fig. 6A

602

| | | | | |
|---|---|---|---|---|
| 9 | 10 | J | Q | K |
| A | J | DOG | 7 | 9 |
| Q | K | 10 | K | A |

Fig. 6B 604 602

| | | | | |
|---|---|---|---|---|
| 10 | DOG (doubling) | 10 | Q | A |
| A | A | DOG (doubling) | 8 | 9 |
| 7 | K | K | 10 | A |

Fig. 6C 604 602

| | | | | |
|---|---|---|---|---|
| 9 | DOG (doubling) | 9 | 10 | 7 |
| 8 | 8 | DOG (doubling) | J | K |
| Q | A | J | K | 7 |

Fig. 6D 604 602

| | | | | |
|---|---|---|---|---|
| K | DOG (tripling) | J | 10 | 9 |
| J | J | DOG (tripling) | J | Q |
| 9 | DOG (tripling) | 9 | K | A |

606

Fig. 6E

GAMING MACHINE WITH FIXED WILD SYMBOLS AND MULTIPLIER

CROSS-REFERENCE TO RELATED APPLICATIONS

The present application claims the benefit of priority to Australian Provisional Patent Application No. 2008901127, filed on Mar. 7, 2008, entitled "GAMING MACHINE WITH FIXED WILD SYMBOLS AND MULTIPLIER", which is herein incorporated by reference in its entirety.

FIELD OF THE INVENTION

The present invention generally relates to gaming machines and methods of gaming.

BACKGROUND OF THE INVENTION

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming machines that are allowable, both in terms of the prevailing regulations and in terms of providing a return on investment to the gaming venue operators.

SUMMARY OF THE INVENTION

According to a first aspect of the invention there is provided a method for use with a gaming machine arranged to provide a spinning reel game in which symbols are spun up on a plurality of reels to form at least one outcome and, if a winning outcome occurs, the gaming machine awards an award, the method including:

(a) if at least one specified symbol is spun up and displayed in a resultant position on a reel, holding the specified symbol in the resultant position for at least one further game in which at least the reel carrying the specified symbol is re-spun; and (b) awarding the award if a winning outcome occurs, wherein a specified symbol including part of a winning outcome has the effect of increasing the award if the specified symbol is adjacent at least one other specified symbol.

The adjacent specified symbol may have a multiplier effect on the award.

The multiplier effect may increase dependent on a quantity of the specified symbols that are adjacent one another on the displayed reels.

In one arrangement the resultant position has four edges and a specified symbol in the resultant position has a multiplier effect if the resultant position shares an edge with an adjacent resultant position in which an adjacent specified symbol is displayed.

In an alternative arrangement the resultant position has four edges and a specified symbol in the resultant position has a multiplier effect if the resultant position shares an edge or a corner with an adjacent resultant position in which an adjacent specified symbol is displayed.

The multiplier effect may be capped.

The specified symbol may be a wild symbol that substitutes for one or more other symbols in assessing whether a winning outcome has occurred.

The specified symbol may be represented as superimposed on underlying symbols as the reel carrying the specified symbol is re-spun.

The specified symbol may be held in the resultant position for a series of spinning reel games.

The specified symbol, if it is spun up in a bought game, may be held in the resultant position for a predetermined number of bought spinning reel games.

In one arrangement the spun-up specified symbol is held in the resultant position if an eligibility criterion is satisfied.

The eligibility criterion may be the occurrence of a trigger condition. The eligibility criterion may be the payment of an ante-bet by a player of the gaming machine.

The satisfaction of the eligibility criterion may commence a series of free games in which all specified symbols that are spun up are held.

According to a second aspect of the invention there is provided a method for use with a gaming machine that is arranged to provide a spinning reel game, the method including the steps of:

stopping a spinning reel in order to display a symbol to a player;

determining whether the symbol is a specified symbol and is adjacent another symbol that was held in a fixed display position while the reel was spinning; and, if so holding the symbol and the other symbol in fixed display positions during at least one subsequent reel spin.

According to a further aspect, the invention broadly resides in a gaming machine to arranged to perform a method as described in the preceding paragraphs.

According to further aspects, the invention broadly resides in instructions executable by a game controller to implement the method as described in the immediately preceding paragraphs and to such instructions when stored in a storage medium readable by the game controller. The instructions may also be conveyed in a data signal.

Further aspects of the present invention will be apparent from the following description, given by way of example and with reference to the accompanying drawings. Also, various embodiments of the aspects described in the preceding paragraphs will be apparent from the appended claims, the following description and/or the accompanying drawings. It should be understood, however, that the present invention is not limited to the arrangements and instrumentality shown in the attached drawings.

BRIEF DESCRIPTION OF THE DRAWINGS

FIGS. 5A-5E show the outcomes of 5 successive reel spins of a game according to certain embodiments of the present invention.

FIGS. 6A-6E show 5 successive outcomes of spinning reel games played in accordance with another arrangement of certain embodiments of the present invention.

DETAILED DESCRIPTION OF THE EMBODIMENTS

Figure 1:
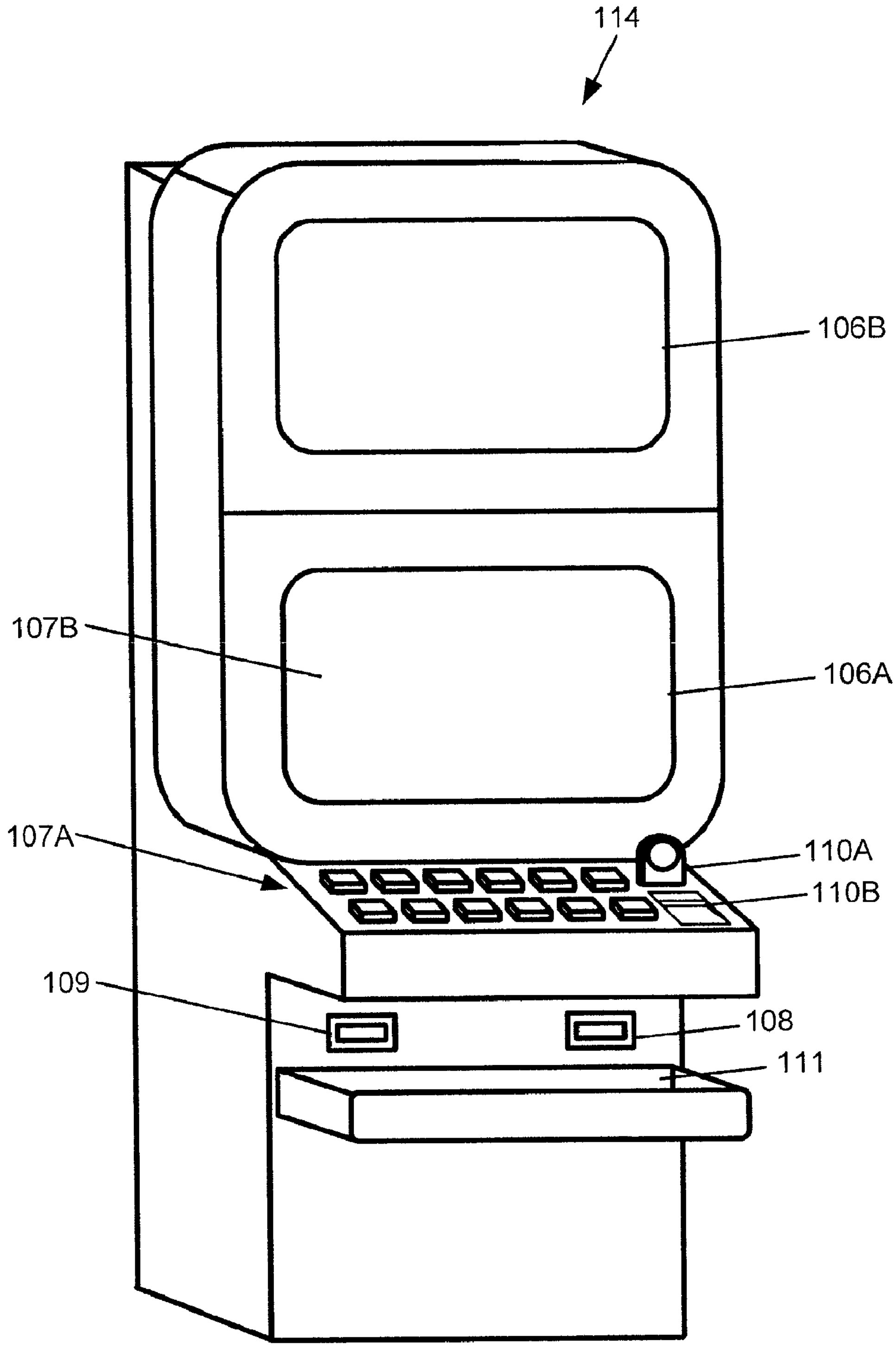
FIG. 1: shows schematically a view of a gaming console suitable for implementing certain embodiments of the present invention.

In FIG. 1 of the accompanying drawings, one example of a gaming console that is suitable to implement certain embodiments of the present invention is generally referenced by arrow 114.

The gaming console 114 includes two displays 106A, 106B on one or both of which is displayed representations of a game that can be played by a player and a bank of buttons 107A and/or a touch screen 107B to enable a player to play the game. The displays 106 may be video display units, such as a cathode ray tube screen device, a liquid crystal display, plasma screen, any other suitable video display unit, or the visible portion of an electromechanical device. The display 106B may display artwork, including for example, pay tables and details of bonus awards and other information or images relating to the game. In alternative gaming consoles the display 106B may be omitted, optionally replaced by a static display.

A credit input including a coin input 110A and/or bill collector 110B allows a player to provide credit for wagering and a coin output 111 is provided for cash payouts from the gaming console 114. A card and/or ticket reader 108 and a printer 109 may be provided to provide player tracking, cashless game play or other gaming and non-gaming related functions.

Figure 2:
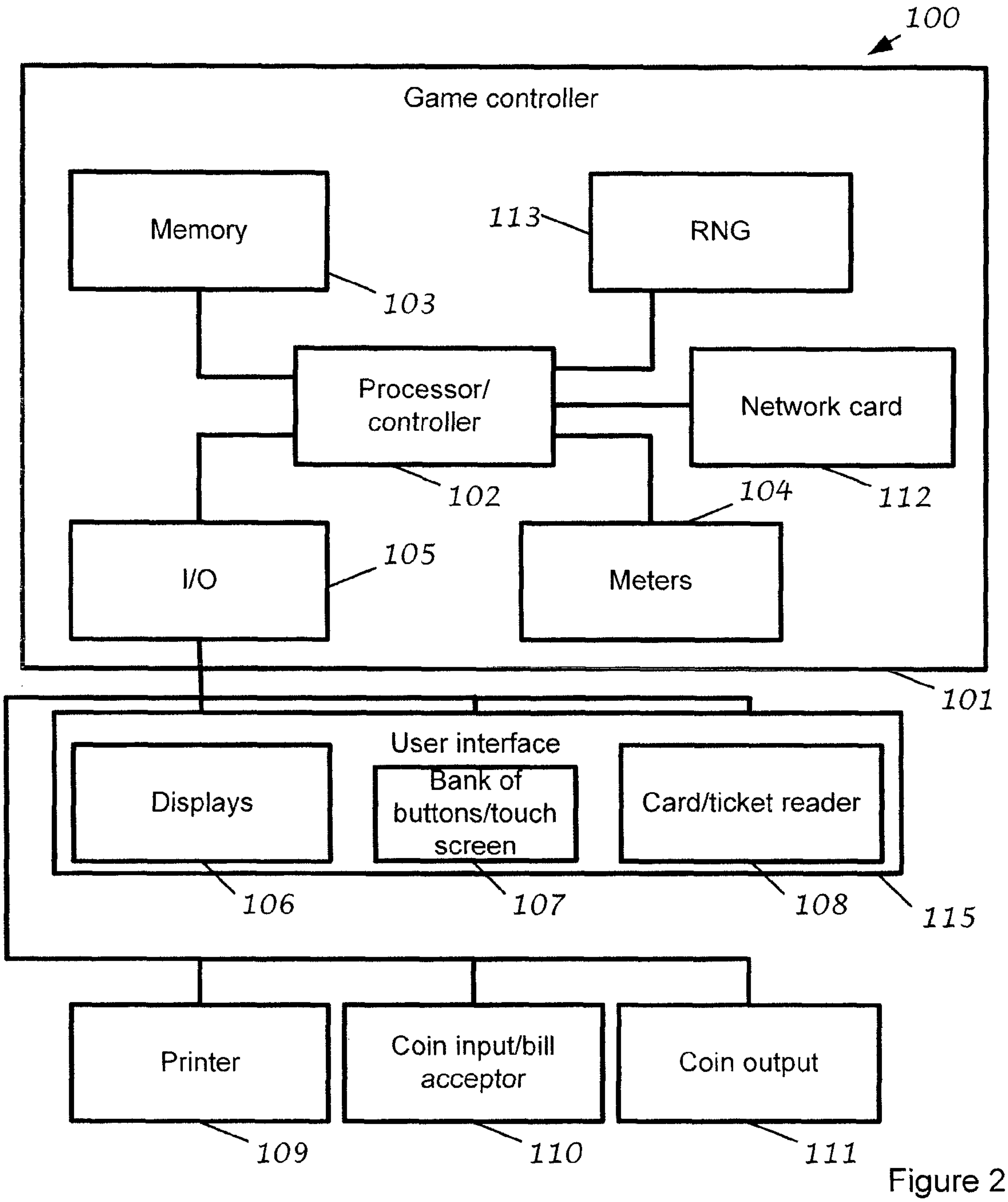
FIG. 2: shows a block diagram of gaming machine suitable for implementing certain embodiments of the present invention.

FIG. 2 shows a block diagram of a gaming machine, generally referenced by arrow 100, suitable for implementing certain embodiments of the present invention. The gaming machine 100 may include the gaming console 114 shown in FIG. 1 and accordingly like reference numerals have been used to describe like components in FIGS. 1 and 2.

The gaming machine 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms part of, the computational device 102. Typically, the gaming machine 100 will include both volatile and non-volatile memory and more than one of each type of memory, with such memories being collectively represented by the memory 103. The instructions to cause the game controller 101 to implement certain embodiments of the present invention will be stored in the memory 103. The instructions and data for controlling operation of the computational device 102 may be stored on a computer readable medium from which they are loaded into the gaming machine memory 103. The instructions and data may be conveyed to the gaming machine by means of a data signal in a transmission channel. Examples of such transmission channels include network connections, the Internet or an intranet and wireless communication channels.

The game controller 101 may include hardware credit meters 104 for the purposes of regulatory compliance and also include an input/output (I/O) interface 105 for communicating with the peripheral devices of the gaming machine 100. The input/output interface 105 and/or the peripheral devices may be intelligent devices with their own memory for instructions and data.

In the example shown in FIG. 2, the peripheral devices that communicate with the controller are the displays 106, bank of buttons/touch screen 107, the card and/or ticket reader 108, the printer 109, a bill acceptor and/or coin input 110 and a coin output 111. Additional devices may be included as part of the gaming machine 100, or devices omitted based on the specific implementation.

The bank of buttons 107A and/or touch screen 107B together with one or both of the displays 106 may provide a user interface 115 through which the gaming machine 100 and player communicate. If a card/ticket reader 108 is provided, this may also form part of the user interface 115.

In addition, the gaming machine 100 may include a communications interface, for example a network card 112. The network card 112, may for example, send status information, accounting information or other information to a central controller, server or database and receive data or commands from the central controller, server or database. The network card 112 may also enable communication with a central player account, allowing cashless gaming. One or more of the peripheral devices, for example the card/ticket reader 108 may be able to communicate directly with the network card 112. The network card 112 and the I/O interface 105 may be suitably implemented as a single machine communications interface.

The game controller 101 may also include a random number generator 113, which generates a series of random numbers that are used by the computational device 102 to determine the outcomes of games played on the gaming machine 100.

The game controller 101 may have distributed hardware and software components that communicate with each other directly or through a network or other communication channel. The game controller 101 may also be located in part or in its entirety remote from the user interface 115. Also, the computational device 102 may include a plurality of devices, which may be local or remote from each other. Instructions and data for controlling the operation of the user interface 115 may be conveyed to the user interface 115 by means of a data signal in a transmission channel. The user interface 115 may be a computational device, for example a personal computer, used by a person to play a game provided from a remote game controller 101.

Figure 3:
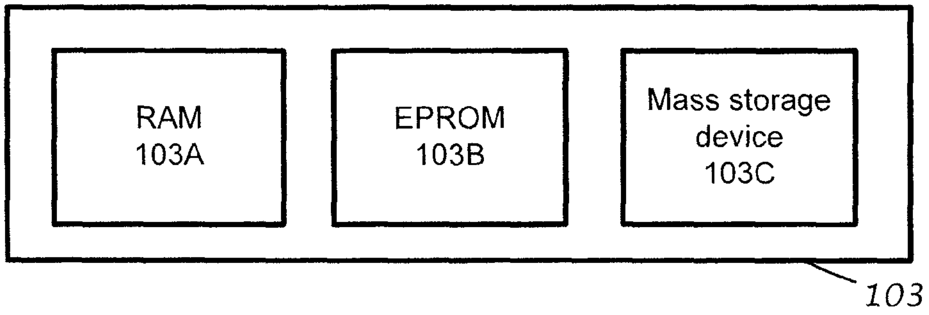
FIG. 3: shows a block diagram of components of the memory of the gaming machine represented in FIG. 2.

FIG. 3 shows an exemplary block diagram of the main components of the memory 103. The RAM 103A typically temporarily holds instructions and data related to the execution of game programs and communication functions performed by the computational controller 102. The EPROM 103B may be a boot ROM device and/or may contain system and game related code. The mass storage device 103C may be used to store game programs, the integrity of which may be verified and/or authenticated by the computational controller 102 using protected code from the EPROM 103B or elsewhere.

Figure 4:
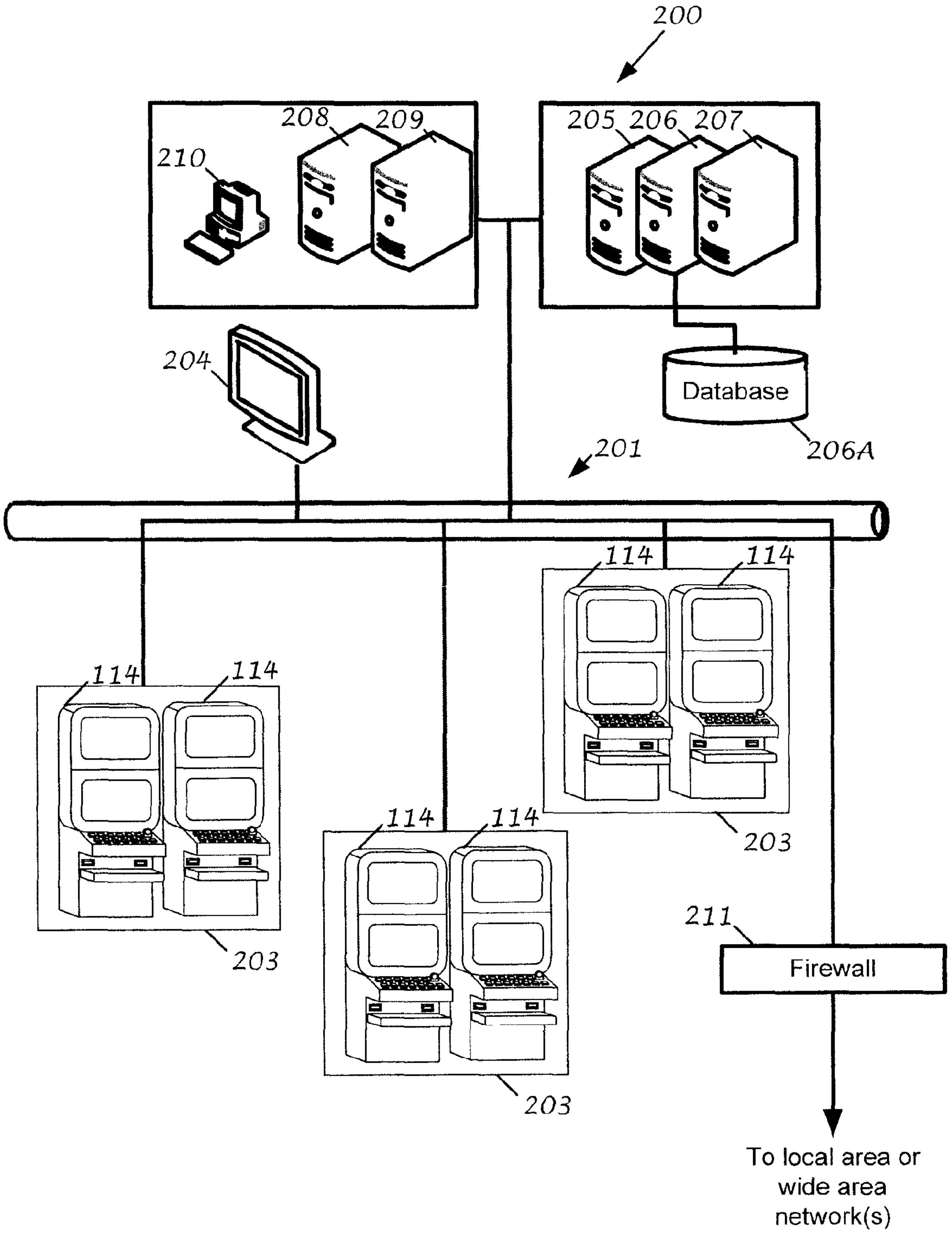
FIG. 4: shows schematically a network gaming system suitable for implementing certain embodiments of the present invention.

FIG. 4 shows a gaming system 200 in the form of a network of devices. The gaming system 200 includes a network infrastructure 201, which for example may be in the form of an Ethernet network. Alternatively, a wireless network and/or direct communication channels, or a different type of network may be used to link the gaming machines to a server, each other and/or other devices. Gaming consoles 114, shown arranged in three banks 203 of two gaming consoles 114 in FIG. 4, are connected to the network infrastructure 201. The gaming consoles 114 may form part or all of a gaming machine 100. Single gaming consoles 114 and banks 203 containing three or more gaming devices 202 may also be connected to the network infrastructure 201, which may also include bank controllers, hubs, routers, bridges to other networks and other devices (not shown).

One or more displays 204 may also be connected to the network 201. The displays 204 may, for example, be associated with a bank 203 of gaming consoles 114. The displays 204 may be used to display representations associated with game play on the gaming devices 202, and/or used to display other representations, for example promotional or informational material.

Servers may also be connected to the network 201. For example, a game server 205 may generate game outcomes for games played on one or more of the gaming consoles 114, a database management server 206 may manage the storage of game programs and associated data in a database 206A so that they are available for downloading to, or access by, game controllers 101, and a jackpot server 207 may control one or more jackpots for the gaming system 200.

Further servers may be provided to assist in the administration of the gaming system 200, including for example a gaming floor management server 208, and a licensing server 209 to monitor the use of licenses to particular games. An administrator terminal 210 is provided to allow an administrator to manage the network 201 and the devices connected to the network. The different servers depicted can be distinct physical servers or logically distinct server processes running on a single physical server.

The gaming system 200 may communicate with other gaming systems, other local networks, for example a corporate network and/or a wide area network such as the Internet through a firewall 211.

Figure 7:
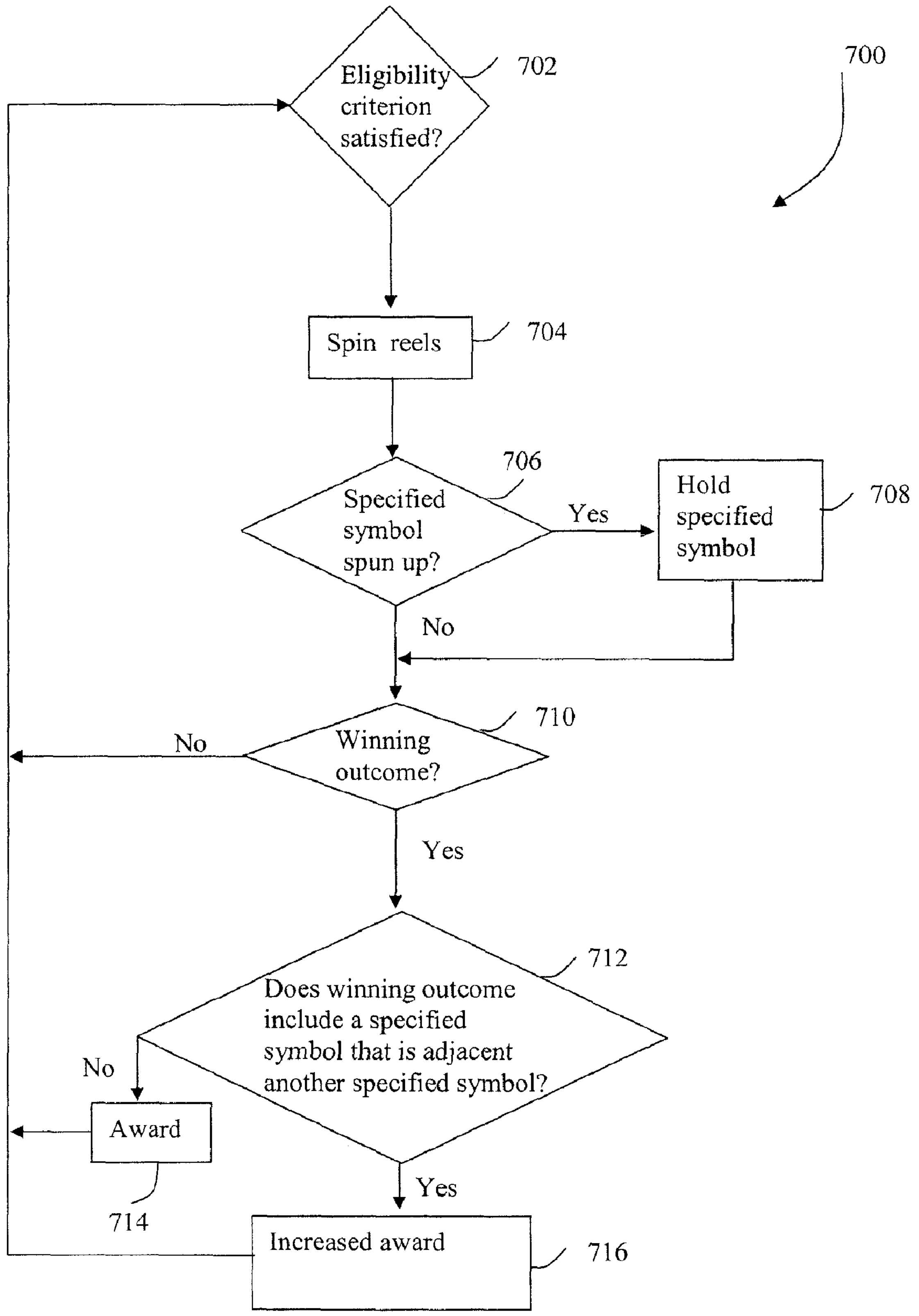
FIG. 7 shows a flow diagram of a process performed in accordance with certain embodiments of the present invention.

FIG. 7 shows a process flow diagram of a process performed in accordance with certain embodiments of the present invention. The process may be performed by the gaming system 200, in which the gaming consoles 114 each include game controllers 101 to form gaming machines 100 and the following description assumes this implementation. However, those skilled in the relevant arts will appreciate that the process will also be able to be implemented by other gaming systems.

The game controller 101 monitors the bill acceptor and/or coin input 110 and/or information received by the card/ticket reader 108 or network card 112 for a deposit of credit and in response causes the hardware meters 104 to increment according to the denomination of the game. The game controller 101 then monitors the user interface 107 for the input of a wager.

If there are sufficient credits in the meters 104 to support the wager, game play is commenced by the game controller 101. In the described arrangement the game is a spinning reel game in which a plurality of spinning reels are spun to display an array of symbols on display 106. The reel spins may be rendered as an animation on the display 106. In one arrangement there are five reels and three symbol positions are displayed for each reel, thus showing a 5*3 symbol array.

In method 700 illustrated in FIG. 7, the game controller monitors game play to assess whether one or more eligibility criteria have been satisfied that enable play of a feature with an additional function. As described below the additional function relates to a 'sticky wild' function in which a special symbol may be held in a superimposed representation in a position on the spinning reels for at least one subsequent game. In the described arrangement the special symbol is a wild symbol that substitutes for one or more other symbols. However, it will be understood that other types of symbol may also be held in the method of FIG. 7.

The method 700 can use a wide range of eligibility criteria. At 702, one or more eligibility criterion are checked to see if they are satisfied. For example, if a particular combination of symbols is displayed on spinning reels in the base game, the eligibility criteria may be satisfied. In one example, the eligibility criterion is the occurrence of 3 or more scattered cat symbols. There are many alternative or additional eligibility criteria. For example, the player may be required to place an ante bet to enable the 'sticky wilds' function.

If the eligibility criterion is satisfied, then in subsequent steps of method 700, special symbols are held on screen for at least one subsequent game after their initial display.

At 704, one or more of the spinning reels are spun and at 706 the controlling software checks whether at least one of the specified symbols has been spun up and displayed on display 106. If this is the case, then at 708 the specified symbol is held in position for at least one subsequent reel spin. In one arrangement the player is granted 5 free spins if the eligibility criterion is satisfied and any specified symbols that are spun up are held for the duration of the feature.

At 710, the controlling software checks whether a winning outcome has occurred on the spun reels. If there is no winning outcome then process flow returns to 702.

If a winning outcome has occurred on the spun reels, then the controlling software at 712 checks whether the winning outcome includes at least one of the specified symbols. A specified symbol increases the win if the specified symbol is adjacent at least one other specified symbol. The adjacent specified symbol may act as a multiplier. The multiplier value may increase as the number of adjacent specified symbols increases. For example, if there are 4 adjacent specified symbols they may have a multiplier value of 4. The multiplier value may be capped. For example, if there are 2 or more adjacent specified symbols the multiplier may be 3.

After the check at 712, if there are no adjacent specified symbols the award 714 is made. If there are adjacent specified symbols associated with the winning outcome, then the increased award 716 is awarded instead. After the award 714, 716 has been made, process flow may return to 702 and, if appropriate, the reels may be spun again.

In subsequent spins the held specified symbols may be highlighted. When the reels are spun, the held symbols may appear to 'lift' off their reels and remain in place on the display 106. The highlighted symbols may thus appear to be superimposed over the underlying reels so that the effect is of a reel spinning behind the held symbols. The held symbols may be rendered with a degree of transparency to enable the underlying reel symbols to be seen on the display 106.

In different arrangements, different criteria may be used to determine whether a specified symbol is adjacent to another specified symbol. In one arrangement a symbol may have a maximum of 4 adjacent symbols, i.e. either directly above or below the position of the symbol or directly to the left or directly to the right. Thus, if the symbol is displayed in a cell having 4 edges, adjacency is determined by cells having a shared edge.

In an alternative arrangement a symbol may have a maximum of 8 adjacent symbols. In this case, diagonal adjacency is also permitted. Here the cells containing symbols may share either an edge or a corner.

Two examples will now be described. In the first example, illustrated in FIGS. 5A-5E, a symbol has a maximum of 4 adjacent symbols. In the second example, illustrated in FIGS. 6A-6E, a symbol may have up to 8 adjacent symbols.

In the first example, illustrated in FIGS. 5A-5E, a player pays a 5*3 spinning reel game having a free game feature. In the specific example the players plays 1 credit on 3 lines (the top, bottom and centre horizontal lines). The eligibility criterion triggering the free game feature is the occurrence of three of more scattered cats on the reels. The feature has five free games. A dog symbol has the function of being wild, i.e. substituting for all other symbols on the reels. During the free games, the dog symbol also acquires the function of being 'sticky'. That is, if a dog symbol is spun up then block 708 of method 700 acts to hold the dog in position until the free game feature is completed. The dog symbol also has an additional multiplier function if it is located adjacent to other held dog symbols.

When the feature is triggered at 702, a message may be displayed on display 106 indicating that five free games are now available.

At 704 the first free game is played and the 5 reels spin. The resultant 5*3 array is illustrated in FIG. 5A. A single dog symbol 502 is spun up on the central reel.

The prizes are evaluated at 710 and the player is paid the prize for 3*9 on the centre line. The dog symbol 502 substitutes for a 9. Since the dog symbol 502 has no adjacent dog symbols, the award 714 is not multiplied.

For the second free game the dog symbol 502 remains in position and all the reels spin at 704. The free game meter is reduced by one. The outcome of the second free game is illustrated in FIG. 5B. The prizes are evaluated at 710 but there is no prize payable for the bet placed and control flow returns to 702.

In the third free game the dog symbol 502 remains in place and the reels are spun at 704. The free game meter is reduced by one. The outcome of the spin is illustrated in FIG. 5C. A further dog symbol 504 has been spun up in the second reel. Dog symbol 504 will remain in position for the remaining free games. The dog 504 is adjacent to the dog 502 and thus the dog symbols may acquire the function of being a multiplier. In the described example the multiplier effects may double an award. The prizes are evaluated at 710. The only prize for the bet is 3 aces on the centre line. Since the dog symbol is wild it may substitute for an ace. The award 716 is double the normal prize for 3 aces. Note that in this arrangement the two dog symbols 502, 504 do not have individual doubling effects on the payout.

After the award 716 is made, process flow returns to 702 and the fourth free game is played. The reels are spun at 704 and the 2 dog symbols 502, 504 remain in place. The free game meter is reduced by one. The outcome of the spin is illustrated in FIG. 5D. The prizes payable are for 3 nines on the top row and 3 eights on the centre row (with the dogs substituting for eights). The prize on the centre row is doubled because the adjacent dog symbols 502, 504 have a doubling function.

Process flow returns to 702 and the final free game is played. The free game meter is reduced by one and the outcome of the spins is illustrated in FIG. 5D. An additional dog symbol 506 is spun up on the second reel, where it appears in the bottom row.

The prizes payable are for 4 jacks on the centre row and 3 nines on the bottom row. The prizes on the centre row and the bottom row are doubled because the adjacent dog symbols 502, 504 have a doubling function. The dog symbol 506 on the third row also has a doubling function as it is adjacent to the dog symbol 504.

The number of free games available has now reduced to zero so no further free games are available and the feature is complete as the eligibility criterion is no longer satisfied. All the dog positions are no longer sticky and in the next reel spin all positions are spun.

A second example is illustrated in FIGS. 6A-6E. Once again the player is playing a 5*3 spinning reel game with a free game feature. In the example, the player plays 1 credit on 3 lines, i.e. the top, bottom and centre horizontal lines. The free game feature is triggered by the occurrence of three or more scattered cat symbols on the reel. In the feature, five free games are provided. Once again the dog symbol has the function of being wild, i.e. substituting for all other symbols on the reel. During the free games, the dog symbol also acquires the function of being 'sticky' in that a spun up dog symbol is held in position until the free game feature is completed. An additional multiplier function is also applied to the dog symbol if it is located adjacent to other sticky dog symbols, including diagonal adjacency. The multiplier function grows as the number of adjacent sticky symbols increases.

When the feature is triggered, a message may be displayed on display 106 indicating that five free games are available.

The first free game is played and the 5 reels are spun to reveal the array illustrated in FIG. 6A. A dog symbol 602 has been spun up in the central position on the middle reel. The dog symbol 602 is held in position for the remainder of the free game feature.

The prizes are evaluated at 710 and 712 and the player is paid for 3 nines on the centre line with the dog symbol 602 substituting for a nine. The outcome of the second free game is illustrated in FIG. 6A. No further dog symbols have been spun up and there are no prizes payable for the bet placed.

The outcome of the third free game is illustrated in FIG. 6C. A second dog symbol 604 is spun up in the top row of the second reel. The dog symbols 602 and 604 are diagonally adjacent and acquire a doubling function. Both dog symbols 602, 604 are sticky and remain in place for the remainder of the free game feature. A player is awarded a prize for 3*10 on the top line and 3*A on the centre line. The dog symbol is wild and substitutes for either an ace or a 10. Because both dog symbols have a doubling effect, the player is paid double the normal prize for three 10s or three aces.

The outcome of the fourth free game is illustrated in FIG. 6D. There are no additional dog symbols. The prizes payable are for 3 nines on the top row and 3 eights on the centre row. Both prizes are doubled because the dog symbols 602 and 604 have retained their doubling function.

For the fifth free game the dog symbols 602 and 604 remain in place and the remaining positions are spun. The free game meter is reduced by one. As seen in FIG. 6E a third dog symbol is spun up in the bottom row of the second cell. The new dog symbol 606 is diagonally adjacent dog symbol 602, which has a doubling function. There are now three adjacent dog symbols displayed and accordingly the dog symbols have a tripling effect on prizes.

For the outcome of FIG. 6E the prizes payable are for 4*J on the centre row and 3*9 on the bottom row. Both prizes are tripled because the dog symbols 602, 606 have a tripling function.

Since the number of free games has reduced to zero the eligibility criterion is no longer satisfied and the free game feature is complete. The dog symbols 602, 604, 606 are no longer held in position and the next time the reels are spun all positions are spun.

In some arrangements, further eligibility criteria may occur during the feature game. For example, if three cat symbols are spun up during the free game feature then the number of free games may be increased.

In the described example, all dog symbols that are spun up during the feature game become sticky. In an alternative arrangement, a special symbol is only held in position if it is adjacent to an existing held special symbol. In this alternative, an initial or seed symbol becomes sticky and remains in place, enabling subsequently displayed special symbols to accumulate.

For example, if the eligibility criteria are satisfied, the player may be informed that the next dog symbol that is spun up will become a sticky wild symbol. Once the seed symbol is held, subsequently spun-up dog symbols are held only if they are adjacent to existing held symbols.

In another example, one or more reels may be designated such that a special symbol that is spun up on a designated reel becomes sticky and is held in place for one or more subsequent reel spins. The symbol on the designated reel becomes a seed, and special symbols that are spun up adjacent to the held seed symbol may also be held in position. Further sticky symbols may accumulate around previously-held symbols.

While the foregoing description has been provided by way of example of certain embodiments of the present invention as presently contemplated, which utilise gaming machines of the type found in casinos, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will also be understood that the term “comprises” (or its grammatical variants) as used in this specification is equivalent to the term “includes” and should not be taken as excluding the presence of other elements or features.

It will be appreciated by persons skilled in the art that numerous variations and/or modifications may be made to the invention as shown in the specific embodiments and/or aspects without departing from the spirit or scope of the invention as broadly described. The present embodiments and aspects are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A method for use with a gaming machine arranged to provide a spinning reel game in which symbols are spun up on a plurality of reels to form at least one outcome and, if a winning outcome occurs, the gaming machine awards an award, the method comprising:

(a) if at least one specified symbol is spun up and displayed in a resultant position on a reel, holding the specified symbol in the resultant position for at least one further game in which at least the reel carrying the specified symbol is re-spun; and (b) awarding the award if a winning outcome occurs, wherein a specified symbol comprising part of a winning outcome has the effect of increasing the award if the specified symbol is adjacent at least one other specified symbol.

2. A method according to claim 1 wherein the adjacent specified symbol has a multiplier effect on the award.

3. A method according to claim 2 wherein the multiplier effect increases dependent on a quantity of the specified symbols that are adjacent one another on the displayed reels.

4. A method according to claim 1 wherein the resultant position has four edges and a specified symbol in the resultant position has a multiplier effect if the resultant position shares an edge with an adjacent resultant position in which an adjacent specified symbol is displayed.

5. A method according to claim 1 wherein the resultant position has four edges and a specified symbol in the resultant position has a multiplier effect if the resultant position shares an edge or a corner with an adjacent resultant position in which an adjacent specified symbol is displayed.

6. A method according to claim 2 wherein the multiplier effect is capped.

7. A method according to claim 1 wherein the specified symbol is a wild symbol that substitutes for one or more other symbols in assessing whether a winning outcome has occurred.

8. A method according to claim 1 wherein the specified symbol is represented as superimposed on underlying symbols as the reel carrying the specified symbol is re-spun.

9. A method according to claim 1 wherein the specified symbol is held in the resultant position for a series of spinning reel games.

10. A method according to claim 1 wherein the specified symbol, if spun up in a bought game, is held in the resultant position for a predetermined number of bought spinning reel games.

11. A method according to claim 1 wherein the spun-up specified symbol is held in the resultant position if an eligibility criterion is satisfied.

12. A method according to claim 11 wherein the eligibility criterion is the occurrence of a trigger condition on the reels.

13. A method according to claim 11 wherein the eligibility criterion is the payment of an ante-bet by a player of the gaming machine.

14. A method according to claim 11 wherein the satisfaction of the eligibility criterion commences a series of free games in which all specified symbols that are spun up are held.

15. A gaming machine arranged to provide a spinning reel game in which symbols are spun up on a plurality of reels to form at least one outcome and, if a winning outcome occurs, the gaming machine awards an award, the gaming machine comprising at least one game controller arranged to:

(a) if at least one specified symbol is spun up and displayed in a resultant position on a reel, hold the specified symbol in the resultant position for at least one further game in which at least the reel carrying the specified symbol is re-spun; and (b) award the award if a winning outcome occurs, wherein a specified symbol comprising part of a winning outcome has the effect of increasing the award if the specified symbol is adjacent at least one other specified symbol.

16. A tangible computer readable storage medium comprising machine-readable program code recorded on a machine-readable recording medium, for controlling the operation of a data processing apparatus on which the program code executes to perform a method for use with a gaming machine arranged to provide a spinning reel game in which symbols are spun up on a plurality of reels to form at least one outcome and, if a winning outcome occurs, the gaming machine awards an award, the method comprising:

(a) if at least one specified symbol is spun up and displayed in a resultant position on a reel, holding the specified symbol in the resultant position for at least one further game in which at least the reel carrying the specified symbol is re-spun; and (b) awarding the award if a winning outcome occurs, wherein a specified symbol comprising part of a winning outcome has the effect of increasing the award if the specified symbol is adjacent at least one other specified symbol.

17. A tangible computer readable storage medium comprising machine-readable program code for controlling the operation of a data processing apparatus on which the program code executes to perform a method for use with a gaming machine arranged to provide a spinning reel game in which symbols are spun up on a plurality of reels to form at least one outcome and, if a winning outcome occurs, the gaming machine awards an award, the method comprising:

(a) if at least one specified symbol is spun up and displayed in a resultant position on a reel, holding the specified symbol in the resultant position for at least one further game in which at least the reel carrying the specified symbol is re-spun; and (b) awarding the award if a winning outcome occurs, wherein a specified symbol comprising part of a winning outcome has the effect of increasing the award if the specified symbol is adjacent at least one other specified symbol.

* * * * *